US010250752B2

(12) United States Patent
Moss et al.

(10) Patent No.: US 10,250,752 B2
(45) Date of Patent: Apr. 2, 2019

(54) TELECOMMUNICATION NETWORK (71) Applicant: STARLEAF LTD, London (GB)

(72) Inventors: Nicholas Ian Moss, Middlesex (GB); Phillip Michael Birtwell, London (GB); Timothy Joseph Nicolson, Rickmansworth (GB)

(73) Assignee: STARLEAF LTD, London (GB)

(*) Notice: Subject to any disclaimer, the term of this patent is extended or adjusted under 35 U.S.C. 154(b) by 0 days.

(21) Appl. No.: 14/203,301

(22) Filed: Mar. 10, 2014

(65) Prior Publication Data

US 2014/0301249 A1 Oct. 9, 2014

Related U.S. Application Data (60) Provisional application No. 61/782,094, filed on Mar. 14, 2013.

(30) Foreign Application Priority Data

Mar. 14, 2013 (GB) .................................. 1304647.9

(51) Int. Cl.
*H04M 3/56* (2006.01)
*H04L 29/06* (2006.01)
(Continued)

(52) U.S. Cl.
CPC ........ *H04M 3/567* (2013.01); *H04L 65/1053* (2013.01); *H04L 65/1056* (2013.01);
(Continued)

(58) Field of Classification Search
None
See application file for complete search history.

(56) References Cited

U.S. PATENT DOCUMENTS 6,553,102 B1 * 4/2003 Fogg ..................... H04M 3/533
  370/401
8,917,855 B1 * 12/2014 Narayanaswamy .... H04M 3/53
  379/265.09
(Continued)

FOREIGN PATENT DOCUMENTS

CN 103188217 A 7/2013
EP 1 619 865 A1 1/2006
(Continued)

OTHER PUBLICATIONS

Combined Search and Examination Report for Patent Application No. GB1304647.9 dated Sep. 13, 2013 in 11 pages.
(Continued)

*Primary Examiner* — Saumit Shah
(74) *Attorney, Agent, or Firm* — Knobbe, Martens, Olson & Bear, LLP (57) ABSTRACT

A telecommunication network 30 for telecommunications between telecommunication end point devices 36,37,38, such as telephones or video phones, the telecommunication network 30 comprising a plurality of telecommunication device control systems 40 implemented by a computer system. Each telecommunication device control system 40 is shared by telecommunication end point devices 36,37,38 allocated to it and is configured to control communication connections involving telecommunications originating from telecommunication end point devices 36,37,38 allocated to it and other telecommunication end point devices. At least some functionality of the plurality of telecommunication device control systems 40 is shared by at least some parts of the computer system.

15 Claims, 3 Drawing Sheets

(51) Int. Cl.
   *H04M 7/00* (2006.01)
   *H04M 3/42* (2006.01)
(52) U.S. Cl.
   CPC ...... *H04L 65/1069* (2013.01); *H04M 3/4228* (2013.01); *H04M 3/56* (2013.01); *H04M 3/561* (2013.01); *H04M 7/006* (2013.01)

(56) References Cited

U.S. PATENT DOCUMENTS

| | | | |
|---|---|---|---|
| 9,137,368 B2 | 9/2015 | Jasper et al. | |
| 2005/0083912 A1* | 4/2005 | Afshar | H04L 29/06027 370/352 |
| 2006/0165066 A1* | 7/2006 | Campbell | H04M 3/5125 370/352 |
| 2008/0063173 A1* | 3/2008 | Sarkar | H04L 12/1827 379/202.01 |
| 2008/0181387 A1 | 7/2008 | Watanabe | |
| 2008/0317238 A1 | 12/2008 | Cai | |
| 2009/0296734 A1* | 12/2009 | Nag | H04L 47/822 370/462 |
| 2010/0162034 A1 | 6/2010 | Degenhardt et al. | |
| 2010/0220634 A1* | 9/2010 | Gisby | H04L 63/0807 370/261 |
| 2010/0284399 A1* | 11/2010 | Mohaban | H04L 63/029 370/352 |
| 2011/0107330 A1* | 5/2011 | Freundlich | G06F 9/45558 718/1 |
| 2012/0254293 A1* | 10/2012 | Winter | H04Q 3/62 709/203 |
| 2013/0019021 A1 | 1/2013 | Lau | |

FOREIGN PATENT DOCUMENTS

| | | |
|---|---|---|
| WO | WO 2006/014176 A2 | 2/2006 |
| WO | WO 2008/016464 A2 | 2/2008 |
| WO | 2011/130179 A2 | 10/2011 |
| WO | WO 2012/135931 A1 | 10/2012 |

OTHER PUBLICATIONS

Combined Search and Examination Report under Sections 17 & 18(3) dated Jun. 22, 2015 for Application No. GB1304647.9, 5 pages.

Combined Search and Examination Report under Sections 17 & 18(3) dated Jun. 22, 2015 for Application No. GB1304647.9, 8 pages.

* cited by examiner

TELECOMMUNICATION NETWORK

CROSS-REFERENCE TO RELATED APPLICATIONS

This application claims the benefit of U.S. Provisional Patent Application No. 61/782,094, filed on Mar. 14, 2013. This application also claims the benefit of United Kingdom Patent Application No. GB1304647.9, filed on Mar. 14, 2013. The disclosures of these applications are hereby incorporated by reference herein in their entireties and made a part of the present disclosure.

TECHNICAL FIELD

The present invention relates generally to a telecommunication network. Embodiments of the invention relate to call control or communication connections of telecommunication devices such as an Internet Protocol (IP) telephone or IP video telephone on the telecommunication network and allocating telecommunication resources, such as media resources to play hold music or conference call controllers, to the telecommunication devices.

BACKGROUND

Calls made by telephones and video telephones are controlled by a call-control system or telecommunication device control system that is usually referred to as a PBX. PBX stands for private branch exchange. While the control systems used by modern VOIP (voice over IP) telephone systems do not exchange anything the term PBX is still commonly used to describe the controllers that have the same core functionality of PBXs used in public switched telephone networks where the term originated.

Current wide-area telecommunications networks for Internet Protocol devices, broadly, have two different configurations or categories for their PBXs that are each described below.

Figure 1:
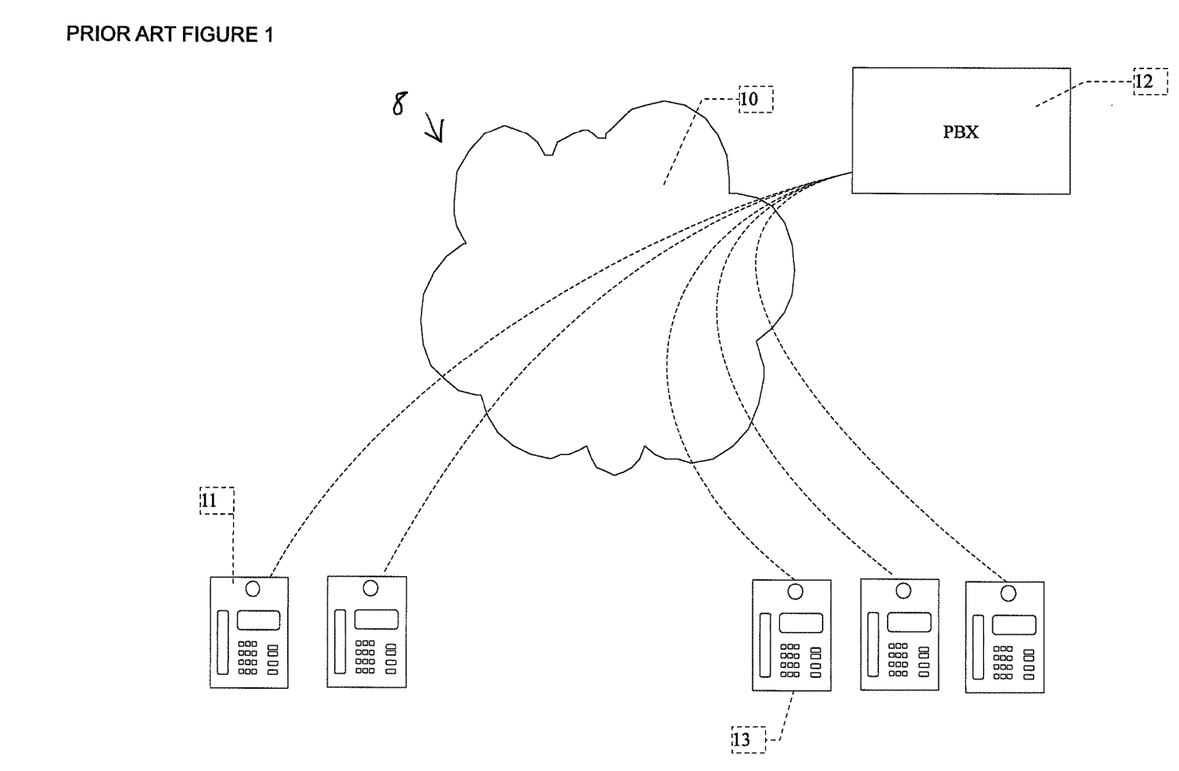
FIGS. 1 and 2 (prior art) are schematic diagrams of known telecommunication networks.

One arrangement uses a PBX shared by a plurality of organisations that is in a single physical location; the plurality of organisations share the same PBX hardware. It is a so-called public network. A telecommunication network 8 incorporating such an arrangement is illustrated in FIG. 1. The telecommunication network of FIG. 1 includes a PBX 12 which offers service to two groups of telephones 11 and 13 via the internet 10. The groups of telephones 11,13 share the hardware resources of the PBX 12. The groups of telephones 11,13 connect to the telephony service (PBX) 12 via the Internet 10. One group of telephones 11 is owned by one organisation and the other group of telephones 13 is owned by another organisation. A call between telephones of the same group (either between telephones in the group of telephones 11 or between telephones in the group of telephones 13) will use the resources of the PBX 12 regardless of where the telephones are located on the globe.

In this type of arrangement, a provider (a PBX 12) may be based in one country and a customer (using telephones 11) may connect to them from anywhere in the world, but a call will be routed via the country of the provider regardless of the destination. As a result, calls may have high latency and data packets forming the telephone call are more at risk of congestion loss because of the large number of hops they need to travel. The further away from this physical location of the PBX the user's telephone is located, the more inefficient the communications and resource usage becomes.

The other current wide-area telecommunications networks for IP devices is a dedicated service for a single organisation spanning a wide area. These are privately owned global telephone systems or private networks which permit an employee to connect their IP phone to an organisation's network from whatever of the organisation's sites they are on. The components in different locations share a common authentication system and a common privately-owned wide-area network or virtual private network (VPN) and so components can be moved from one location to another and will use the local resources. A telecommunication network 18 incorporating such an arrangement is illustrated in FIG. 2.

Figure 2:
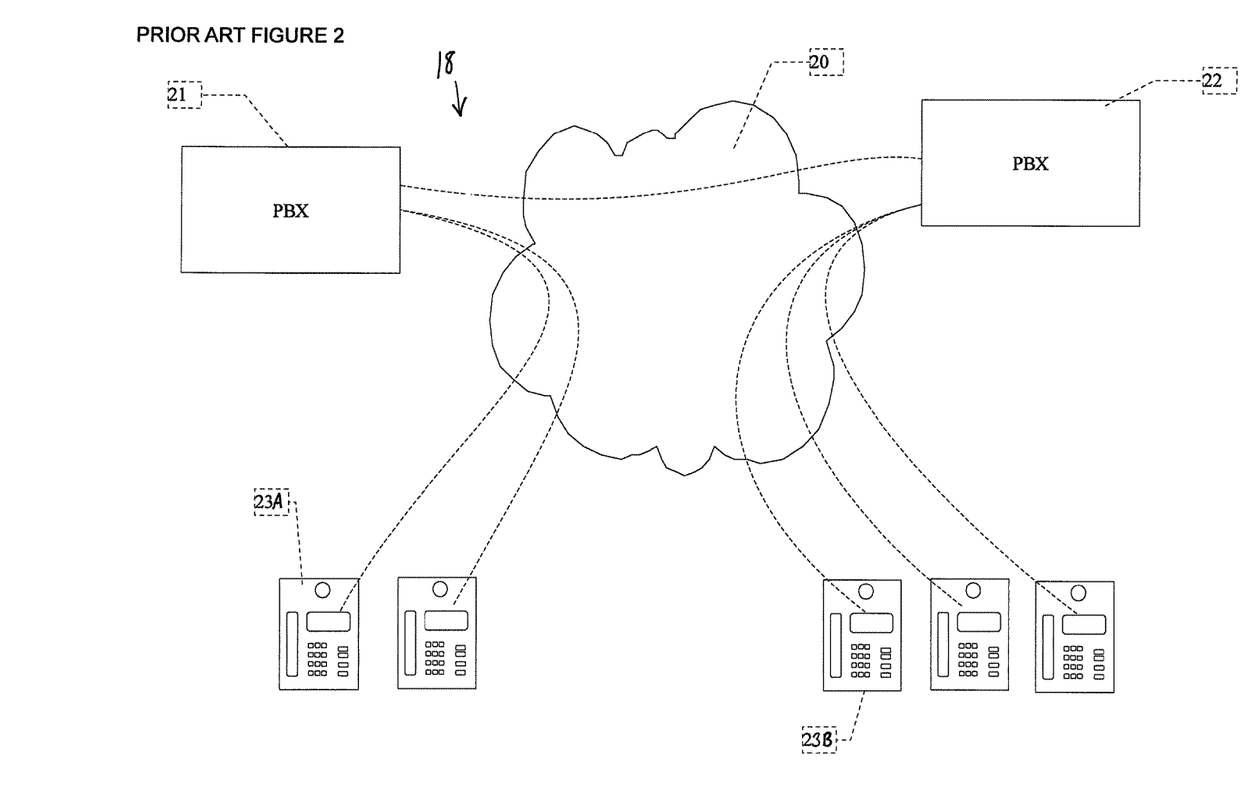

FIG. 2 illustrates a single set of telephones for a single organisation split into two groups 23A, 23B. Some of these telephones 23A connect to one PBX 21 via the Internet 20 and some of these telephones 23B connect to another PBX 22 via the Internet 20 thus, between them the telephones 23A, 23B of one organisation connect to two PBXs. These PBXs, in the telecommunications network 18, form part of a distributed telecommunications network which is owned by a single organisation.

In the arrangement of FIG. 2, the telephones 23A,23B are each connected to the PBX 21 or 22 of their organisation that is located physically closest to them. If a telephone 23A,23B was moved so it was now closer to the other PBX, it attaches to the new local PBX and uses its resources without intervention from the user; it is transparent to the user and the user would receive the same service experience that they received in the old location.

The corporate telecommunications system or private network of FIG. 2 allows local connection to a user and routes calls more efficiently than in the public network example of FIG. 1. However, the networks and hardware of the arrangement of FIG. 2 is owned by a single organisation cannot be shared with other organisations.

SUMMARY

Embodiments of the invention address the problems of the prior art described above.

The invention in its various aspects is defined in the independent claims below to which reference should now be made. Advantageous features are set forth in the dependent claims.

Arrangements are described in more detail below and take the form of a telecommunication network for telecommunications between telecommunication end point devices, such as telephones or video phones, the telecommunication network comprising a plurality of telecommunication device control systems implemented by a computer system. Each telecommunication device control system is shared by telecommunication end point devices allocated to it and is configured to control communication connections involving telecommunications originating from telecommunication end point devices allocated to it and other telecommunication end point devices. At least some functionality of the plurality of telecommunication device control systems is shared by at least some parts of the computer system.

In an aspect of the present invention, there is provided a telecommunication network for telecommunications between telecommunication end point devices, the telecommunication network comprising: a plurality of telecommunication device control systems implemented by a computer system, each telecommunication device control system being shared by telecommunication end point devices allocated to it, and each telecommunication device control system being configured to control communication connections involving telecommunications originating from telecommunication end point devices allocated to it and other telecommunication end point devices, wherein at least some functionality of the plurality of telecommunication device control systems are shared by at least some parts of the computer system.

The telecommunication network may further comprise a provisioning computer system configured to allocate one of the plurality of telecommunication device control systems to each of the telecommunication end point devices. One of the plurality of telecommunication device control systems may be allocated to each of the telecommunication end point devices according to one or more of the following: geographical location of a telecommunication end point device, latency of communications with the telecommunication end point device, available bandwidth of communication to and/or from the telecommunication end point device, monetary cost of communication to and/or from the telecommunication end point device, impact on maintaining service level agreements to and/or from the telecommunication end point devices. The provisioning computer system may be further configured to allocate computerized telecommunication resources to each telecommunication end point device.

The computerized telecommunication resources may comprise one or more of the following: media resource, such as on-hold audio or the like, border controller for controlling telecommunication across a border, such as a firewall or the like, conference call controller. The computerized telecommunication resources may comprise a plurality of conference call controllers. The provisioning computer system may be configured to allocate telecommunication end point devices to one of the conference call controllers of the plurality of conference call controllers based on at least one predetermined criterion. The at least one predetermined criterion may comprise one or more of: physical proximity of telecommunication end point device to a conference call controller, the number of conference call controllers on the telecommunication network, the number of media streams between conference call controllers, the number of telecommunications end point devices forming the conference call. The computerized telecommunication resources may be configured to be shared by some of the plurality of telecommunication end point devices.

The telecommunication device control systems may be configured to control communication connections between telecommunication end point devices via the Internet. The telecommunication device control systems may be configured to control a telecommunication end point device connected to the Internet once a valid identity of the telecommunication end point device is received from the telecommunication end point device. The identity may comprise at least one of a signal generated in response to a hardware token applied to the telecommunication end point device and/or credentials entered into a user interface of the telecommunication end point device. The end point devices may comprise telephones and/or video phones.

The telecommunication device control systems may each comprise at least one storage device configured to store information regarding telecommunication end point devices allocated to it. The at least one storage device may be configured such that telecommunication end point devices allocated to a different telecommunication device control system may access the stored information. The information may comprise one or more of: at least some of an address book, at least some of a dial plan, presence detect for providing an indication of presence of a user and their availability to receive a call at their telecommunication end point device on the telecommunication network, divert-to-mobile information for providing a mobile telephone number to divert a telephone call to if one or more predetermined criterion are met.

In another aspect of the present invention, there is provided a telecommunication network for telecommunications between telecommunication end point devices, the telecommunication network comprising: a plurality of computerized telecommunication resources, each computerized telecommunication resource being configured to provide telecommunication resources to a plurality of different telecommunication events; and a computerized telecommunication resource allocator for allocating at least one of the plurality of computerized telecommunication resources to a telecommunication event between telecommunication end point devices on the network, the computerized telecommunication resource allocator being configured to assess the telecommunication resource requirements of a telecommunication event and at least one predetermined criterion comprising at least one of the following: geographical location of at least one of the telecommunication end point devices and/or telecommunication resource, latency of at least some communication to and/or from at least one of the telecommunication end point devices and/or telecommunication resource, available bandwidth of at least some communication to and/or from at least one of the telecommunication end point devices and/or telecommunication resource, monetary cost of at least some communication to and/or from at least one of the telecommunication end point devices and/or telecommunication resource, impact on maintaining service level agreements of at least some communication to and/or from at least some of the telecommunication end point devices and/or telecommunication resource; and allocate at least one of the plurality of computerized telecommunication resources accordingly.

The computerized telecommunication resources may comprise one or more of the following: media resource, such as on-hold audio or the like, border controller for controlling telecommunication across a border, such as a firewall or the like, conference call controller. The computerized telecommunication resources may be shared by some of the plurality of telecommunication end point devices. The end point devices may comprise telephones and/or video phones.

In another aspect of the present invention, there is provided a computerized telecommunication resource allocator for allocating at least one of a plurality of computerized telecommunication resources to a telecommunication event between telecommunication end point devices on a telecommunication network, the computerized telecommunication resource allocator being configured to assess telecommunication resource requirements of a telecommunication event and at least one predetermined criterion comprising at least one of the following: geographical location of at least one of the telecommunication end point devices and/or telecommunication resource, latency of at least some communication to and/or from at least one of the telecommunication end point devices and/or telecommunication resource, available bandwidth of at least some communication to and/or from at least one of the telecommunication end point devices and/or telecommunication resource, monetary cost of at least some communication to and/or from at least one of the telecommunication end point devices and/or telecommunication resource, impact on maintaining service level agreements of at least some communication to and/or from at least some of the telecommunication end point devices and/or telecommunication resource; and allocate at least one of a plurality of computerized telecommunication resources accordingly.

The computerized telecommunication resources may comprise one or more of the following: media resource, such as on-hold audio or the like, border controller for controlling telecommunication across a border, such as a firewall or the like, conference call controller. The computerized telecommunication resources may be shared by some of the plurality of telecommunication end point devices. The end point devices may comprise telephones and/or video phones.

In another aspect of the present invention, there is provided a computerized telecommunication resource on a telecommunications network, the computerized telecommunications resource configured to: provide a telecommunications resource to telecommunication events under the control of different telecommunication device control systems.

The computerized telecommunication resource may comprise one or more of the following: media resource, such as on-hold audio or the like, border controller for controlling telecommunication across a border, such as a firewall or the like, conference call controller.

The telecommunications event may comprise an end point device to end point device call or a conference call comprising three or more end point devices.

In another aspect of the present invention, there is provided a telecommunication method for telecommunications between telecommunication end point devices, the telecommunication method comprising: at least some parts of a computer system sharing at least some functionality between a plurality of telecommunication device control systems each controlling communication connections between telecommunication end point devices.

In another aspect of the present invention, there is provided a computerized method of allocating at least one of a plurality of telecommunication resources to a telecommunication event between telecommunication end point devices on a telecommunication network, the computerized method comprising: assessing telecommunication resource requirements of a telecommunication event and at least one predetermined criterion comprising at least one of the following: geographical location of at least one of the telecommunication end point devices and/or telecommunication resource, latency of at least some communication to and/or from at least one of the telecommunication end point devices and/or telecommunication resource, available bandwidth of at least some communication to and/or from at least one of the telecommunication end point devices and/or telecommunication resource, monetary cost of at least some communication to and/or from at least one of the telecommunication end point devices and/or telecommunication resource, impact on maintaining service level agreements of at least some communication to and/or from at least some of the telecommunication end point devices and/or telecommunication resource; and allocating at least one of a plurality of computerized telecommunication resources accordingly.

In another aspect of the present invention, there is provided a computer system for enabling telecommunication connections through a firewall, the computer system comprising: a relay system configured to be located on the public Internet on one side of a firewall and configured to be shared by a plurality of telecommunication end point devices each on another, private side of a firewall, the relay system being configured to relay media to and from each telecommunication end point device that share the relay system, the relay system being configured to be allocated to particular telecommunication end point devices based on at least one predetermined criterion. The predetermined criterion may comprise: geographical location of at least one of the telecommunication end point devices and/or relay system, latency of at least some communication to and/or from at least one of the telecommunication end point devices and/or relay system, available bandwidth of at least some communication to and/or from at least one of the telecommunication end point devices and/or relay system, monetary cost of at least some communication to and/or from at least one of the telecommunication end point devices and/or relay system, impact on maintaining service level agreements of at least some communication to and/or from at least some of the telecommunication end point devices and/or relay system.

In another aspect of the present invention, there is provided a computerized method for enabling telecommunication connections through a firewall, the computerized method comprising: allocating a relay system to particular telecommunication end point devices based on at least one predetermined criterion, the relay system being located on the public Internet on one side of a firewall and shared by a plurality of telecommunication end point devices, and the relay system relaying media to and from each telecommunication end point device that share the relay system.

Thus, a system provides PBX, telecommunication device control system or call control functionality to multiple organisations sharing hardware in a global Internet telecommunications network. A telephone or video-telephone device connected directly or indirectly to the Internet and, in particular, the global Internet, may obtain efficient telephone or video-telephone service as part of an organisation's telephone system by connecting to a shared, globally accessible, cloud-based Internet Telephony network. In this way, an efficient, global, shared telephony service is provided to an internet protocol enabled telephony device or end point. The Internet connected telephony or videotelephony device receives service from a distributed network of devices in the Internet which have the characteristics of being shared with other organisations, and being distributed physically across the world.

Embodiments of the present invention provide a method and system that provides telephony service to a device connected to the global Internet. The embodiments offer both the benefits of a shared hosted telephony system and the benefits of a global telephony system. It allows a voice or video end point to connect to a globally provisioned shared telecommunications network and receive efficient resource allocation based on the physical location of the user combined with the features and abilities (for example, dialplan) associated with the organisation to which the user belongs.

A global telecommunications network infrastructure of embodiments of the present invention may be owned by a service provider and organisations then use this infrastructure by agreement with the service provider. Each of the organisations has its own virtual call-control system on the network but the hardware which provides this call-control is shared between organisations.

Embodiments of the present invention are particularly applicable to a video telecommunications network although the telecommunications network may also be used for voice-only communications. This is because the high bandwidth or data transfer rate of video makes the prior art arrangements described above unsuitable for video.

BRIEF DESCRIPTION OF THE DRAWINGS

The invention will be described in more detail, by way of example, with reference to the accompanying drawings, in which.

DETAILED DESCRIPTION

A telecommunication network for telecommunications between telecommunication end-point devices, such as IP telephones or IP video phones, embodying aspects of the invention will now be described with reference to FIG. 3.

Figure 3:
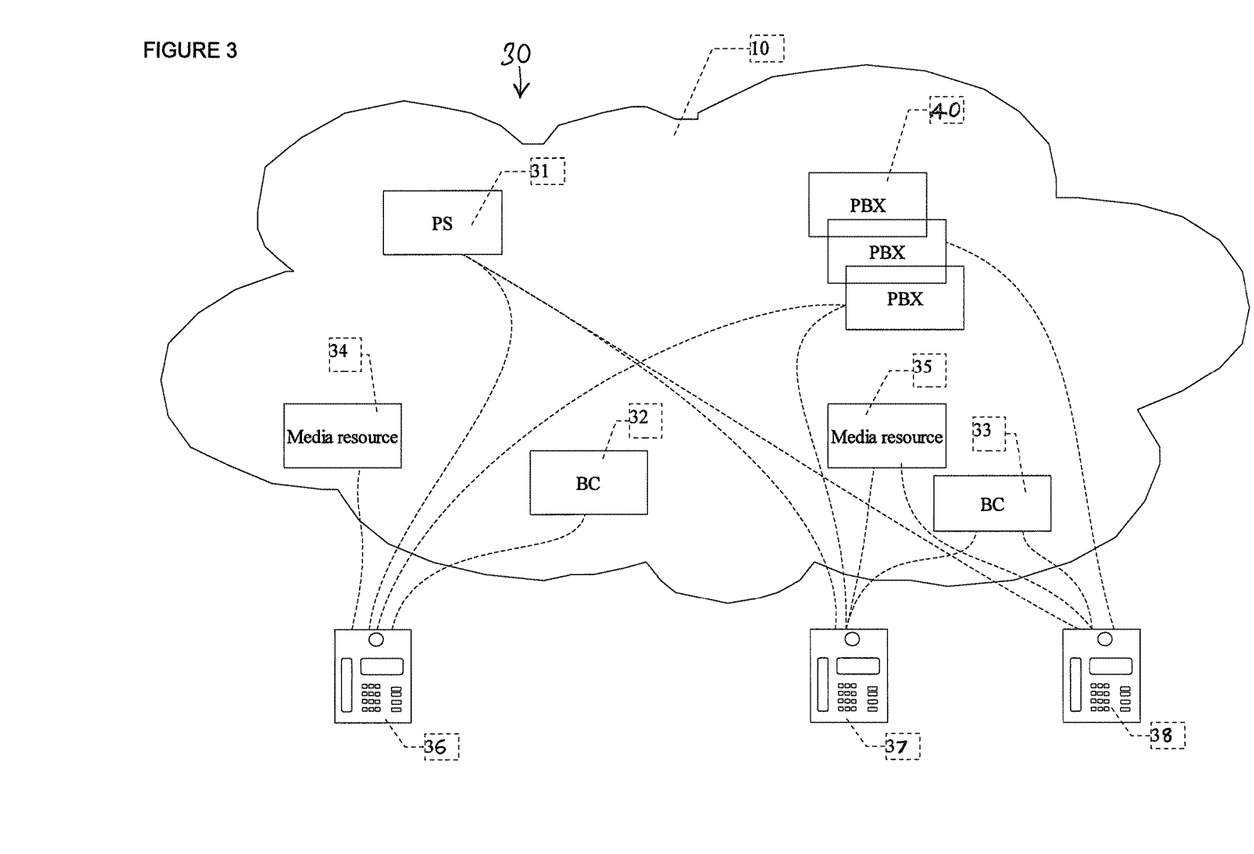
FIG. 3 is a schematic diagram of a telecommunication network embodying an aspect of the present invention.

Broadly, the telecommunication network 30 of FIG. 3 is a global shared telecommunications network. The telecommunication network includes a plurality of telecommunication device control systems or PBXs 40. It includes, in this example, one group of PBXs 40. However, there may be more than one group of PBXs. Each of the telecommunication device control systems is configured to make and control communication connections between telecommunication end-point devices, in this example, IP telephones or IP video phones 36,37,38. The communication connections involve telecommunications or calls originating from telephones allocated or assigned to the particular telecommunication device control system. Each telecommunication end point device, end point device or telephone is connected to its associated PBX by the Internet 10 (although they could be connected by other networks). Each end point device is controlled by a single one of the PBXs. The allocation of a PBX to a particular telephone (or other end point device) does not mean that the particular telephone has exclusive use of the PBX. Typically, many telephones have use of each PBX. However, each telephone uses only a single PBX; a PBX assigned or allocated to a particular telephone has exclusive control over that telephone. The plurality of telecommunication device control systems are implemented by one and only one computer system. Each telecommunication device control system may be a single call-control device located anywhere on the Internet or it may be a distributed call-control device in a plurality or several geographical locations. The computer system typically includes a plurality of computers on a network, but may include a single computer or bespoke hardware. Significantly, at least some functionality of the plurality of telecommunication device control systems are shared by at least some parts of the computer system. Furthermore, importantly, the allocation or sharing of the computer resources shared by the PBXs is not done for the benefit of just one customer or end point, but for a plurality of endpoints. The allocation is carried out by a software module of the computer system shared by the PBXs, which is outside the control or not controlled by any single PBX. This software module may be distributed, central or collocated with the part of the shared computer system or hardware resource that implements the PBXs.

A PBX is allocated to a particular end-point device by a provisioning server 31. The provisioning server forms part of the telecommunication network 30. It is in communication connection to the end-point devices 36,37,38 via the Internet 10. The provisioning server takes the form of a provisioning computer system comprising one or more computers on a network. The telecommunication network 30 also includes telecommunication resources or shared media-processing devices including border controllers 32, 33 and media resources 34, 35 (as well as conference call controllers, which are not shown in FIG. 3). Resources of this type are distributed across the Internet or network. They too may be in communication connection with the end-point devices or telephones 36,37,38 via the Internet. How these communication connections are formed and configured is discussed in more detail further below.

End-point devices or telephones 36,37,38 are assigned to a PBX 40 based on their identity under the control of the provisioning server or provisioning computer system 31. The end-point devices are assigned to media-processing devices or media resources based on physical location (although other bases or predetermined criterion are possible as described further below). In this example, there are three end-point devices or telephones shown. Two of these telephones 36,37 belong to the same organisation. The other telephone 38 belongs to another organisation. This aspect of the telecommunication network is also discussed in more detail below.

Provisioning and Registration

The provisioning server 31 or provisioning computer system is created on the public Internet. Typically, it is not run by the organisation or company owning the IP telephones or endpoint devices 36,37,38 or the IP PBX 34. They may be run by the manufacturer of the IP telephones, or by an independent organisation. They are trusted by the IP telephones to provide the necessary information to reach the PBX or a gateway belonging to the company that owns the IP telephone. The IP telephone 36,37,38 locates a provisioning server 32 using any of the methods described below. The provisioning server then provides information to the end point in order for it to connect to the correct PBX 40.

When powered on, the telephones 36,37,38 connect to the provisioning server 31 via the Internet 10 and identify themselves. They may identify themselves in any of several means. For example, this identification may be by using any of the many authentication systems available, such as digital certificates, or a username and a password entered by a user of the telephone, network address or local network address, such as a Media Access Control address (MAC), and a password entered by a user of the telephone. The telephone may also provide geographical location or geolocation information such as latitude and longitude of the telephone from a global positioning system (GPS) or nearby wireless network access point (WiFi access point) addresses or source Internet Protocol (IP) address of the request.

The provisioning server 31 then uses the identity of the user or end-point device 36,37,38 to direct the device to a PBX or virtual PBX 40. As described above, the PBX may be a single call-control device anywhere on the Internet, or it may be a distributed call-control device in several geographical locations. In this latter case, the provisioning server may use the credentials of the user or end point device as received or provided by the end point device as described above to direct the device to connect to the nearest appropriate PBX. Alternatively, the provisioning server may use the latency of communications with the user or end-point device to direct the end point device to connect to the nearest appropriate PBX. In other words, geographical nearness is not necessarily a measure of the physical nearness of two devices (the PBX and the end point device), but may be a measure of the time taken and congestion encountered by a packet travelling from one device to another over the Internet. The provisioning server may select the PBX based on the available bandwidth or data transfer rate of communication to and/or from the end point device. The provisioning server may select the PBX based on the monetary cost of communication to and/or from the end point device. The provisioning server may select the PBX based on the impact on maintaining service level agreement or agreements to and/or from the end point device.

The end point device or telephone 36,37,38 then connects to the PBX 40 and authenticates itself forming a communication connection or communications channel between them. This communications channel allows the telephone to issue and handle call-control operations from the PBX assigned to it.

Telecommunication Resource Allocation

In the example network 30 of FIG. 3, a computerized telecommunication resource allocator allocates or assigns at least one of a plurality of computerized telecommunication resources to a call between telecommunication end point devices on the network. In this example, a computerized telecommunication resource allocator is located at or forms part of the provisioning server (the provisioning server and the computerized telecommunication resource allocator may be separate computer systems) and another computerized telecommunication resource allocator is located at or forms part of each PBX 40 (the PBX and the computerized telecommunication resource allocator may be separate computer systems). Telecommunication resources are telecommunication services that may be required by a telephone end point device other than forming a communication connection or setting up and ending a call. They are typically dedicated digital signal processing (DSP) devices. The aforementioned computerized telecommunication resource allocators assign computerized telecommunication resources, such as media resources (for example, on-hold audio or music resources or the like) 34,35, Network Address Translation (NAT) routing services (not shown in FIG. 3) and a border controller 32,33 for controlling telecommunications across a border and, in particular, a firewall (a particular border controller arrangement is described in more detail further below) to the telephones 36,37,38 during a telecommunication event such as during a telephone call. The computerized telecommunication resource allocator allocates or assigns at least one of the plurality of the computerized telecommunication resources to a call between telecommunication end point devices on the network by assessing the telecommunication resource requirements of the call or telecommunication event and allocating at least one of the computerized telecommunication resources accordingly. The computerized telecommunication resources are each configured to provide a telecommunications resource to telecommunication events under the control of different telecommunication device control systems or PBXs 40. It is another example of shared resources in the telecommunication network described herein. The resource allocator uses the geographical location of the user or telephone either from geolocation data in the request, or associated with the IP address of the user to determine the most local group of telecommunications resources to assign to the end point device or telephone (and not the PBX that controls it). In this example, the resource allocator also provides a second and further choices of nearby telecommunications resources (such as in neighbouring cities or countries) to the end-point device to provide an alternative if the first or further choice fails (for example, the geographically nearest telecommunications resource in unavailable either due to device failure or network failure) or, in other words, allow failover from the best and subsequent choices. In addition to or as an alternative to using geographical location event other predetermined criterion may be used by the resource allocator to allocate resources. These include: latency of at least some communication to and/or from at least one of the telecommunication end point devices and/or telecommunication resource, available bandwidth or date transfer rate of at least some communication to and/or from at least one of the telecommunication end point devices and/or telecommunication resource, monetary cost of at least some communication to and/or from at least one of the telecommunication end point devices and/or telecommunication resource, and/or impact on maintaining service level agreements of at least some communication to and/or from at least some of the telecommunication end point devices and/or telecommunication resource. The aim is to produce a balanced load across the resources available on the network based on one or more of the criteria set-out above. The impact of maintaining service level agreements as mentioned above is a particular issue for the shared cloud-based PBX system described herein that does not exist in the prior art examples discussed above. In shared cloud-based PBX system described herein, the impact on a service level agreement for customer A is taken into account when deciding if a shared resource can be given to customer B. By way of example, customer A has paid to have a service level agreement that includes always being able to have a resource in the form of a conference bridge. If, however, all the conference bridges are given to customer B and customer A then decides to create a conference requiring a conference bridge then customer A's service level agreement will be broken. Thus, when allocating resources to customer B the service level agreement of customer A needs to be considered or, more generally, when allocating resources to one customer, user or end point device, the service level agreements of other customers, users or end point devices is taken into consideration. In other words maintenance of service level agreements is about endeavouring to maintain such agreements across some or all users or end point devices.

Two paradigms or methods may be used for choosing an appropriate resource for each particular end-point or telephone 36,37,38 to aim to achieve a balanced load. Notably, this is not dependent on the PBX that controls the telephone and the same resource may be used or shared by different telephones under the control of different PBXs. The two methods are a distributed resource allocation system (in which the list of all possible resources available for allocation is maintained or stored in a storage device near the provisioning server 31 and passed to the end point devices for them to attempt allocation) and a centralized resource allocation system (in which the list of all possible resources available for allocation is held or stored in a storage device centrally for use by the PBXs which attempt allocation). These are described in turn below.

Distributed Resource Allocation

Distributed resource allocation by the provisioning server 31 is as follows. During the provisioning phase of a telephony end-point's 36,37,38 connection to the telephony network 30, the resource allocator in the form of a computer or computers on a network near the provisioning server 31 may use knowledge of the geographical location of the user or telephone (independent of its controlling PBX) to indicate to the user a list of geographically near or nearest telecommunication resources (such as media resources 34,35 or border controller 32,33). This list typically includes the nearest telecommunication resources of various types to the end-point as well as a plurality of other telecommunication resources of various types in increasing distance from the end-point. This list is kept or stored in a store or memory (typically a solid-state memory) of the telephony end-point such that when it needs to use one of these resources it can contact the resource directly. The endsystem or end-point device may re-request the list of geographically local resources from the provisioning server at any time and the provisioning server will then receive this request and, in response, send or transmit a new list to the end-point where it is stored in the store or memory of the end-point device and replaces the previous stored list. Generally, the closer a telecommunication resource is to an end-point device the quicker the end-point device will receive the desired response from the telecommunication resource. However, as an alternative to be provided with and storing the geographically nearest or closest media resource, the end-point device may be provided with and store the telecommunication resource which is expected to provide it with the desired response in the shortest time or lowest latency. As described above, there are other methods for selecting an appropriate resource, such as, available bandwidth or data transfer rate, monetary cost of communication, and impact on maintaining service level agreements (as described above where maintenance of service level agreements is about endeavouring to maintain such agreements across all or at least some users or end point devices). In use, by way of example, if an endpoint device 36,37,38 wanted hold music to play to a user of the device that has been put on hold by its controlling PBX 40, it requests the media resource (provided using one of the arrangements described above) in the form of a local music resource to provide a media stream of hold music as indicated. The local music resource may accept the request and stream music to the requesting endpoint device. Alternatively, the local music resource may decline the request in which case the endpoint device would proceed to request the next most geographically near music server as stored in its store and repeat the request. This process is continued with by making requests to ever more distant or otherwise less favourable media resources as indicated in the store of the end-point until the end-point's request is met by a media resource.

Another example of the system in use relates to when an endpoint device is behind a firewall and therefore requires firewall-traversal help from a resource in the form of a border controller 32,33 (an external but geographically local media relay device). By way of example, the endpoint device would make a request for relaying services from the most local relay device (or otherwise most desirable relay device depending on the criteria used). The relay service may accept the request and then allow itself to be used to relay media from and to that endpoint device. Alternatively, it may decline the request in which case the endpoint device would proceed to the next most geographically near media relay server (or otherwise next most desirable server) and repeat the request. Again, this process is continued with by making requests to ever more distant (or less desirable) services as indicated in the store of the end-point until the end-point's request is met by a service.

Each endsystem or endpoint device 36,37,38 may maintain a communication connection with some local (or otherwise desirable) telecommunication resources 32,33,34,35 such as media resources even when they are not being used by that end system. This allows the end system to more quickly decide whether to use most-local resources or less optimal (for example, second or third choice) resources. In this arrangement, the telecommunication resources are configured to periodically transmit or send information on their status to the endpoint devices desiring to maintain a communication connection with them. The endpoint devices then expect to periodically receive this status information. Based on this periodic status information received from resources or deduced from a resource failing to provide periodic status information or the endpoint failing to receive it, the endsystems may quickly decide whether to use most-local or most-desirable resources or less optimal resources (for example, second or third choice). This could be because the status information transmitted from a resource and received from the resource by the endpoint indicates that: the resource is low on capacity and will be rejecting new requests, the resource has been taken out of service, or a service level agreement (SLA) could not be met for a particular customer if other customers were allowed to make further requests of this resource. Thus resource allocation is based not only on the most technically suitable device, but other things including whether a particular resource will impact on an SLA with another customer.

Centralized Resource Allocation

In centralized resource allocation, telecommunication resources 32,33,34,35 of the types described above are allocated to an endpoint device 36,37,38 by a centrally located computerized resource allocator in the form of a computer or computers on a network.

In this arrangement, geographical knowledge and/or other relevant information about the end point device 36,37,38 is passed from the computerized resource allocator to the call-control system or PBX 40. This may happen during registration, on demand from the call-control system, or on demand from the end point device (for example, if the end point device observes a change in its location). Telecommunication resources 32,33,34,35, such as media resources or other resources as described above, are then requested on behalf of the endpoint device by the call-control system.

In use, by way of example, if a user of an end point device 36,37,38 is to be placed on hold, then the call-control system or PBX 40 will make a request to a media resource 34,35 in the form of an on-hold music server geographically near (if that is the criteria used to assign or allocate a resource) based on information or data stored at the computerized resource allocator to the user's endpoint for that music server to stream on-hold media to the user's endpoint device. The music server may accept the request and proceed to stream media or music to the endpoint device. It may alternatively decline the request in which case the PBX would proceed to the next most geographically near (or otherwise next most desirable) music server based on data stored at the computerized resource allocator and repeat the request and so on until the request is met.

Another example, in use, would be for an end point device 36,37,38 that is behind a firewall and therefore requires firewall-traversal help from an external but local media relay device or border controller 32,33. The call-control system 40 would make a request for relaying services from the most local (or otherwise most desirable) relay device or border controller based on data stored at the computerized resource allocator on behalf of the endpoint device. The relay service may accept the request and then allow itself to be used to relay media from and to the endpoint device. Alternatively, it may decline the request in which case the call-control system would proceed to the next most geographically near (or next most desirable) media relay server based on data stored at the computerized resource allocator and repeat the request and so on until the request is met.

Similarly to distributed resource allocation, each call-control system or PBX 40 may maintain a communication connection with the telecommunication resources 32,33,34,35, such as media resources local (or most desirable) to its clients or assigned end point devices 36,37,38 even when they are not being used by those clients. In this arrangement, the telecommunication resources are configured to periodically transmit or send information on their status to the PBX desiring to maintain a communication connection with them. The PBXs then expect to periodically receive this status information. Based on this periodic status information received from resources or deduced from a resource failing to provide periodic status information or the PBX failing to receive it, the PBXs may (quickly) decide whether to use most-local resources or less optimal resources (for example, second or third choice). This could be because the status information transmitted from a resource and received from the resource by the PBX indicates that: the resource is low on capacity and will be rejecting new requests, or the resource has been taken out of service, or a service level agreement could not be met for a particular customer if other customers were allowed to make further requests of this resource.

Call Placement

A user places a call or sets up a telecommunication event by dialing the number on a user interface of their end point device or telephone 36,37,38 of the endpoint device or telephone they wish to call in the usual way. This number is transmitted by the end point device to the PBX 40 assigned to the end point device over the Internet 10. The PBX sets up and controls the call between the end point devices so that a communication connection is established between them over the Internet and the communication connection is broken when the call is ended by one or more of the users pressing an appropriate button or placing the handset of the telephone in its cradle. The configuration of this communication connection is described below.

When a user places a call using their end point device 36,37,38, the end point or telephone and call-control system (PBX) 40 between them decide what, if any, media resources 34,35 are required for the call. If no media resources are required, then the telephone sends and receives media streams directly with the called-party's device. However, there are several reasons why a media stream may not be able to be sent directly to the called-party's device, in which case telecommunication resources 32,33 are required as explained below.

One such reason is control of the border between a corporate network and the public Internet 10. In this case, the firewall at the border may only allow telecommunications with a restricted list of addresses on the public Internet, or may not allow connection into the corporate network except from a restricted list of sources. This may be due to, for example, security policy or network address translation requirements. This list would include the addresses of the border controllers 32,33 of the telecommunications providers network. This is a "safe" address that would be known to an IT department responsible for the corporate network so that they can program their firewall to flag the addresses of the border controllers as "safe". The telephones or endpoint device 36,37,38 are then instructed to send their media streams to a nearby border controller. A border controller is a computer system for enabling telecommunication connections through a firewall. It includes a relay system located on the (public) Internet on one side of a firewall. The relay system is shared by a plurality of end point devices each on another, private side of a firewall. The relay system relays media to and from each end point device that shares the relay system. (This shared border controller is another example of a shared resource). The border controller is selected or allocated following the method based on the list of border controllers made available by the distributed or centralized allocation methods or at least one predetermined criterion described above. The selected border controller passes on the media streams from the source end-point device on to the final destination end-point device or to a border-controller near to the final destination, which then sends them on to the final destination end-point device.

Another reason why a media stream may not be able to be sent directly to the called-party's end point device 36,37,38 is a mismatch between the capabilities of the end point devices. In this case, the end point devices or telephones are instructed to send their media streams to a geographically nearby border controller or transcoding engine (selected following the method based on the list of border controllers made available by the distributed or centralized allocation methods described above) 32,33 to translate between the different formats required by the end point devices.

If a call is put on hold then the end point device or telephone 36,37,38 put on hold should receive on-hold music and/or video (in the case of a video phone) provided by a media resource or on-hold server 34,35 geographically near to the telephone as selected following the method based on the list of media resources made available by the distributed or centralized allocation methods described above.

If a multi-phone conference is required then the telecommunications system can allocate telecommunication resources in the form of conferencing media resources (not shown in FIG. 3) which are geographically near (or otherwise desirable) to the group of telephones 36,37,38 requiring the conference as selected following the method based on the list of telecommunication resources made available by the distributed or centralized allocation methods described above, or in the case of large conferences may distribute the conference across several conference bridges to minimise the amount of long-distance traffic, again, as selected following the method based on the list of telecommunication resources made available by the distributed or centralized allocation methods described above.

Global Shared PBX Inter-Organisation Extensions

A telecommunication network 30 of the type described above in which the telecommunication network may be, in effect, shared between two (or more) organisations allows controlled sharing of information between some or all of these organisations which would otherwise be difficult to implement. This sharing of information may include, for example, two (or more) different but collaborating organisations choosing to share partial address books or partial dialplans to allow better communications between the two (or more) organisations or two (or more) organisations that have a close business relationship could choose to allow presence-detect (an indication of presence of a person and their availability to receive calls at their telephone) or divert-to-mobile information (a mobile telephone number to divert a telephone call to if one or more predetermined criterion are met, such as, if the user does not answer their telephone within a particular time or number of rings) to be shared for certain employees.

The ease of information sharing is achieved as the information to be shared regarding telephones allocated to a particular PBX (address books, dialplans, presence-detection and divert-to-mobile information) is stored in a storage device (such as a hard disk drive) of the PBX 40 allocated as the PBX of each organisation as this PBX functionality is shared by at least some parts of the same computer system. Thus, by providing access to this data by simply providing appropriate permissions, the information may be shared.

Public Global Hot-Desking

A global telecommunications network 30, such as that described here, which was subscribed to by managed offices could advantageously offer temporary connection to a corporate system on that network by a telephone 36,37,38 included as part of an office rental (for example).

An employee of a company could rent an office for a short period, that rental including use of a telephone 36,37,38 connected to the global telecommunications network 30 that their company uses. The employee can then connect to the company's telecommunications system by identifying themselves with a valid identity, by way of example, using a hardware token such as a smart card that causes a signal to be sent to the telecommunication system or credentials such as a username and password entered into a user interface of the employee's telephone (and the telephone being configured accordingly). That telephone is then directed to connect to the company's telephone system implemented on the telecommunication network described above and takes on the characteristics assigned by that company for the duration of the user's residence in the rented office.

Multipoint Conference

The telecommunication network 30 may include telecommunication resources each in the form of conference controllers or conference call controllers (not shown in FIG. 3) in the form of one or more computers on a network connected to the Internet 10.

For a multipoint conference with centralized resource allocation, a call-control system or PBX 40 may use the collective knowledge of the geographical locations or physical proximity of the conference participants telephones or end point devices 36,37,38 to efficiently partition the conference across various geographically diverse conference controllers.

The call-control system or PBX 40 would group participants to use a particular conference controller with geographically similar (or otherwise desirable) locations using a trade-off between the number of conference controllers used, the number of interconnecting media streams between the conference controllers and the number of participants (end point devices 36,37,38) connected to each conference controller to decide which participants should use which conference controller and how those controllers should interconnect.

Once this decision is made, the call-control system 40 would contact each conference controller resource to allocate those resources. A conference controller may accept the request and set up the media resources to satisfy the conference requirements, or it could decline the request, in which case the call control system would either repeat the request to a geographically next-best (or otherwise next-best) conference controller, or it may change the topology of the conference controllers and their interconnects in order to find a solution which all the conference controllers will accept. This process may repeat until a solution is found or until the call control system rejects the original conference request from the user's end point device 36,37,38.

Embodiments of the present invention have been described. It will be appreciated that variations and modifications may be made to the described embodiments within the scope of the present invention. For example, while embodiments have been described with reference to a telecommunication devices in the form of end point devices or telephones, these end point device may include an IP telephone or an IP video telephone or videophone. The end point device may also be a computer such as a laptop computer, desktop computer or smart phone.

The invention claimed is:

1. A telecommunication network for telecommunications between telecommunication end point devices, the telecommunication network comprising:
a plurality of PBXs implemented by a computer system comprising a single hardware platform, each PBX being shared by telecommunication end point devices allocated to it, and each PBX being configured to control communication connections involving telecommunications originating from telecommunication end point devices allocated to it and other telecommunication end point devices,
wherein at least some functionality of the plurality of PBXs shared between the plurality of PBXs is configured to be stored in a memory of the computer system,
wherein the computer system is configured to:
receive a request for a telecommunication event;
determine telecommunication resource requirements for the telecommunication event;
allocate, based on the telecommunication resource requirements, resources of a first PBX of the plurality of PBXs to implement the telecommunication event by allocating resources of the first PBX that are on a public internet side of a firewall; and
allocate, based on the telecommunication resource requirements, resources of a second PBX of the plurality of PBXs to implement the telecommunication event by allocating resources of the second PBX that are on a private side of the firewall.

2. A telecommunication network according to claim 1, wherein one of the PBXs is allocated to each of the telecommunication end point devices according to one or more of the following:
geographical location of a telecommunication end point device,
latency of communications with the telecommunication end point device,
available bandwidth of communication to and/or from the telecommunication end point device,
monetary cost of communication to and/or from the telecommunication end point device, and
impact on maintaining service level agreements to and/or from the telecommunication end point devices.

3. A telecommunication network according to claim 2, further comprising a provisioning computer system configured to allocate one of the plurality of PBXs to each of the telecommunication end point devices and wherein the provisioning computer system is further configured to allocate computerized telecommunication resources to each telecommunication end point device.

4. A telecommunication network according to claim 3, wherein the computerized telecommunication resources comprise one or more of the following:
media resource,
border controller for controlling telecommunication across a border, and
conference call controller.

5. A telecommunication network according to claim 4, wherein the computerized telecommunication resources comprise a plurality of conference call controllers.

6. A telecommunication network according to claim 5, wherein the provisioning computer system is configured to allocate telecommunication end point devices to one of the conference call controllers of the plurality of conference call controllers based on at least one predetermined criterion.

7. A telecommunication network according to claim 6, wherein the at least one predetermined criterion comprise one or more of:
physical proximity of telecommunication end point device to a conference call controller,
the number of conference call controllers on the telecommunication network, the number of media streams between conference call controllers, and the number of telecommunications end point devices forming the conference call.

8. A telecommunication network according to claim 4, wherein the computerized telecommunication resources are configured to be shared by some of the plurality of telecommunication end point devices.

9. A telecommunication network according to claim 1, wherein the PBXs are configured to control a telecommunication end point device connected to the Internet once a valid identity of the telecommunication end point device is received from the telecommunication end point device.

10. A telecommunication network according to claim 9, wherein the identity comprises at least one of a signal generated in response to a hardware token applied to the telecommunication end point device and/or credentials entered into a user interface of the telecommunication end point device.

11. A telecommunication network according to claim 1, wherein functionality of the first PBX of the plurality of PBXs is at least partially shared by the second PBX of the plurality of PBXs.

12. A telecommunication network according to claim 1, wherein the at least some functionality of the plurality of PBXs shared between the plurality of PBXs comprises information associated with at least one of a border controller, conference bridge, address book, dial plan, presence detection, or divert-to-mobile.

13. A telecommunication network according to claim 1, wherein the plurality of PBXs are implemented on the single hardware platform.

14. A telecommunication network according to claim 13, wherein a telecommunication end point device of the telecommunication end point devices is allocated to two or more PBXs.

15. A telecommunication network according to claim 1, wherein the computer system is configured to allocate resources of the first PBX of the plurality of PBXs to implement the telecommunications event by allocating resources of the first PBX under control of a different telecommunication device that includes an internet protocol telephone.

* * * * *